United States Patent Office 2,842,512
Patented July 8, 1958

2,842,512

TETRAHYDROFURFURYL NAPHTHENATE AND VINYL POLYMERS PLASTICIZED THEREWITH

James L. Jezl, Swarthmore, Pa., assignor to Sun Oil Company, Philadelphia, Pa., a corporation of New Jersey No Drawing. Application April 21, 1953
Serial No. 350,213

4 Claims. (Cl. 260—30.4)

This invention relates to new chemical compounds and to vinyl polymers plasticized therewith.

The new chemical compounds according to the invention are esters of tetrahydrofurfuryl alcohol and petroleum naphthenic acids. They may be represented by the formula $C_4H_7O \cdot CH_2OOCR$, where $C_4H_7O$ is the tetrahydrofuryl radical and OOCR is a naphthenic acid residue.

The new chemical compounds according to the present invention may be prepared by esterification of tetrahydrofurfuryl alcohol with a suitable acylating agent such as petroleum naphthenic acids or anhydrides or chlorides of the latter. The naphthenic acids may have been obtained in any suitable manner from petroleum, and may be lubricating oil naphthenic acids, gas oil naphthenic acids, kerosene naphthenic acids, etc. Preferably, the naphthenic acids used have saponification numbers within the range from 125 to 250 mg. of KOH per gram, though acids having saponification number outside that range may also be used.

The esterification used to prepare the esters of the invention may be carried out, for example, by reacting tetrahydrofurfuryl alcohol with petroleum naphthenic acids in the presence of an esterification catalyst such as p-toluene sulfonic acid, mineral acid, etc., and in the presence of an organic solvent such as an aromatic hydrocarbon, etc. The alcohol and acylating material are preferably employed in approximately equimolar quantities, based on the average molecular weight of the acylating material. Other esterification methods may also be used.

The novel esters of the invention are useful in a variety of applications, e. g. as solvents, lubricants, plasticizers for vinyl polymers and for cellulose esters and ethers, mineral oil additives, chemical intermediates, etc. They are particularly useful as plasticizers for vinyl polymers, which are polymers obtained from vinyl monomers, i. e. monomers containing the structural element $CH_2=C<$. Vinyl monomers will be considered herein as including vinylidene monomers. Examples of vinyl monomers are styrene, alpha-methylstyrene, dichlorostyrene, vinyl naphthalene, vinyl phenol, acrylic acid, and the alpha-alkyl substituted acrylic acids; the esters of these unsaturated acids, such as methyl acrylate, methyl methacrylate, butyl methacrylate and propyl acrylate; the vinylidene halides, such as vinylidene chloride, vinylidene bromide and vinylidene fluoride, the vinyl esters of the inorganic acids, such as the halogen acids and hydrocyanic acid, as vinyl chloride, vinyl bromide, acrylonitrile, and methacrylonitrile; the vinyl esters of the monocarboxylic acids, such as vinyl acetate, vinyl chloroacetate, vinyl benzoate, vinyl valerate, and vinyl caproate; the vinyl esters of the polycarboxylic acids, such as divinyl succinate, divinyl adipate, vinyl allyl phthalate, vinyl methallyl pimelate, and vinyl methyl glutarate, the vinyl esters of the unsaturated acids, such as vinyl acrylate, vinyl crotonate, and vinyl methacrylate; the vinyl ethers, such as vinyl ethyl ether, vinyl butyl ether, and vinyl allyl ether, and the vinyl ketones, such as vinyl butyl ketone, and vinyl ethyl ketone. Other vinyl-type polymers may also be plasticized by the esters of the present invention, such as the resins obtained as the result of reaction between polyvinyl alcohol and aldehydes. Polyvinyl formal, polyvinyl acetal and polyvinyl butyral resins are illustrative of this latter group of resins.

Esters for use as plasticizers in vinyl polymer compositions are preferably prepared from naphthenic acids having saponification number within the range from 150 to 250 mg. of KOH per gram, more preferably from naphthenic acids having saponification number within the range from 170 to 220 mg. of KOH per gram.

Plasticized vinyl polymer compositions according to the invention preferably contain from 5 to 60 percent of tetrahydrofurfuryl naphthenate, though other concentrations may be suitable in some instances. More preferably the plasticized composition contains 30 to 50 percent of the ester plasticizer.

The following examples illustrate the invention:

Example 1

Lubricating oil petroleum naphthenic acids were esterified with tetrahydrofurfuryl alcohol to form the novel compounds of the invention.

The naphthenic acids used had the following properties:

| | |
|---|---|
| Saponification number | 188.7 mg. of KOH per gram. |
| Acid number | 181.4 mg. of KOH per gram. |
| Bromine number (A. S. T. M. D875–46T) | 4.7. |
| S. U. viscosity at 210° F. | 112.4 seconds. |

These acids had been previously substantially completely de-oiled by extraction of their soaps with a petroleum hydrocarbon solvent.

150 grams (0.505 mole equivalents) of these naphthenic acids, 51.5 grams (0.505 mole equivalents) of tetrahydrofurfuryl alcohol, 10 grams of p-toluene sulfonic acid, and 150 ml. of toluene were refluxed until the theoretical amount of water had been recovered in a Dean-Stark tube. The reaction products were diluted with petroleum naphtha, then washed with aqueous ethanol, mild caustic soda, and aqueous ethanol again. Solvent was stripped from the washed products, which weighed 174 grams, and those products were then distilled under vacuum to recover a 94 weight percent distillate product boiling from 326° F. to 460° F. at 0.6 to 1.1 mm. Hg. This product was diluted with about 100 ml. of pentane per 100 grams of product and filtered through 70 grams of a 3:1 mixture of coarse and fine fuller's earth per 100 grams of product. The product obtained, which comprised mainly tetrahydrofurfuryl naphthenate, was a nearly colorless liquid and had the following properties:

| | |
|---|---|
| Saponification number | 153.1 |
| Acid number | 0.89 |
| Bromine number | 1.4 |
| S. U. viscosity at 210° F. | 46.6 |
| Refractive index $n_D^{20}$ | 1.4881 |
| Specific gravity $d_4^{20}$ | 0.9974 |

Example 2

The tetrahydrofurfuryl naphthenate prepared in the preceding example was milled with vinyl chloride resin and sheeted off to obtain a plasticized sheet having highly satisfactory properties. The milling formula was as follows:

| | Grams |
|---|---|
| "Geon 101" (trade-mark for vinyl chloride resin) | 58.6 |
| Tetrahydrofurfuryl naphthenate | 40.0 |
| Lead carbonate | 0.95 |
| Stearic acid | 0.45 |

The above materials were intimately admixed in the indicated proportions and then placed on the rolls of a 3" x 8" rubber mill and milled at 290–300° F. The tetrahydrofurfuryl naphthenate plasticizer was found to be completely compatible with the resin, and the fused resin and plasticizer were sheeted off to obtain a flexible, plasticized sheet having good color and other properties. Some of the properties were obtained on a molded sheet prepared from a part of the milled sheet.

The properties of the plasticized composition were found to be as follows:

| | |
|---|---|
| Volatility (percent weight loss after 3 hours at 100° C.) | 0.37 |
| Tensile strength in p. s. i. | 2400 |
| Modulus in p. s. i. | 2260 |
| Elongation in percent at break | 350 |
| Shore hardness | 73 |
| Brittle point in °F. | 10 |
| Heat stability (time for color change at 150° C.) in hours | 4 |

This example shows that tetrahydrofurfuryl naphthenate is compatible in 40 percent concentration with vinyl chloride resin, to produce a plasticized composition having highly satisfactory properties.

*Example 3*

The tetrahydrofurfuryl naphthenate prepared in Example 1 was used as one of two plasticizers in the preparation of a plasticized vinyl chloride resin composition. The milling formula was as follows:

| | Grams |
|---|---|
| Geon 101 | 58.6 |
| Tetrahydrofurfuryl naphthenate | 20.0 |
| Di (2-ethylhexyl) phthalate | 20.0 |
| Lead carbonate | 0.95 |
| Stearic acid | 0.45 |

The manner of preparing the plasticized sheet was essentially the same as that employed in Example 2. The ingredients of the mixture were found to be completely compatible. The properties of the plasticized composition were found to be as follows:

| | |
|---|---|
| Volatility | 0.22 |
| Tensile strength | 2240 |
| Modulus | 2125 |
| Elongation | 335 |
| Shore hardness | 70 |
| Brittle point in °F. | 0 |
| Heat stability | 4 |

This example shows that highly satisfactory plasticized vinyl chloride resin compositions may be prepared using tetrahydrofurfuryl naphthenate as one of a plurality of plasticizers.

The invention claimed is:

1. A plastic vinylidene polymer composition consisting essentially of vinylidene polymer plasticized with tetrahydrofurfuryl alcohol esters of petroleum naphthenic acids having saponification number within the approximate range from 150 to 250 mg. of KOH per gram, said esters comprising 5 to 60 weight percent of the total composition.

2. A plastic polyvinyl chloride composition consisting essentially of polyvinyl chloride plasticized with about 5 to 60 weight percent based on total composition of tetrahydrofurfuryl alcohol esters of petroleum naphthenic acids having saponification number within the approximate range from 150 to 250 mg. of KOH per gram.

3. A plastic polyvinyl chloride composition consisting essentially of polyvinyl chloride plasticized with about 30 to 50 weight percent based on total composition of tetrahydrofurfuryl alcohol esters of petroleum naphthenic acids having saponification number within the approximate range from 150 to 250 mg. of KOH per gram.

4. A plastic polyvinyl chloride composition consisting essentially of polyvinyl chloride plasticized with about 20 weight percent based on total composition of tetrahydrofurfuryl alcohol esters of petroleum naphthenic acids having saponification number within the approximate range from 150 to 250 mg. of KOH per gram and about 20 weight percent based on total composition of dioctyl phthalate.

References Cited in the file of this patent

UNITED STATES PATENTS

| | | |
|---|---|---|
| 2,234,615 | Alexander | Mar. 11, 1941 |
| 2,564,679 | Drake | Aug. 21, 1951 |
| 2,616,865 | Valko | Nov. 4, 1952 |
| 2,628,249 | Bruno | Feb. 10, 1953 |

OTHER REFERENCES

Ser. No. 332,700, Muller (A. P. C.), published Apr. 20, 1943